R. L. WATKINS.
PHOTOMICROGRAPHIC AND PROJECTING APPARATUS.
APPLICATION FILED DEC. 23, 1910.

1,049,182.

Patented Dec. 31, 1912.

4 SHEETS—SHEET 1.

Witnesses:
C. A. Jarvis
C. T. Neal

Inventor:
Robert L. Watkins.
by Geo. L. Wheelock
attorney.

R. L. WATKINS.
PHOTOMICROGRAPHIC AND PROJECTING APPARATUS.
APPLICATION FILED DEC. 23, 1910.
1,049,182.
Patented Dec. 31, 1912.
4 SHEETS—SHEET 2.
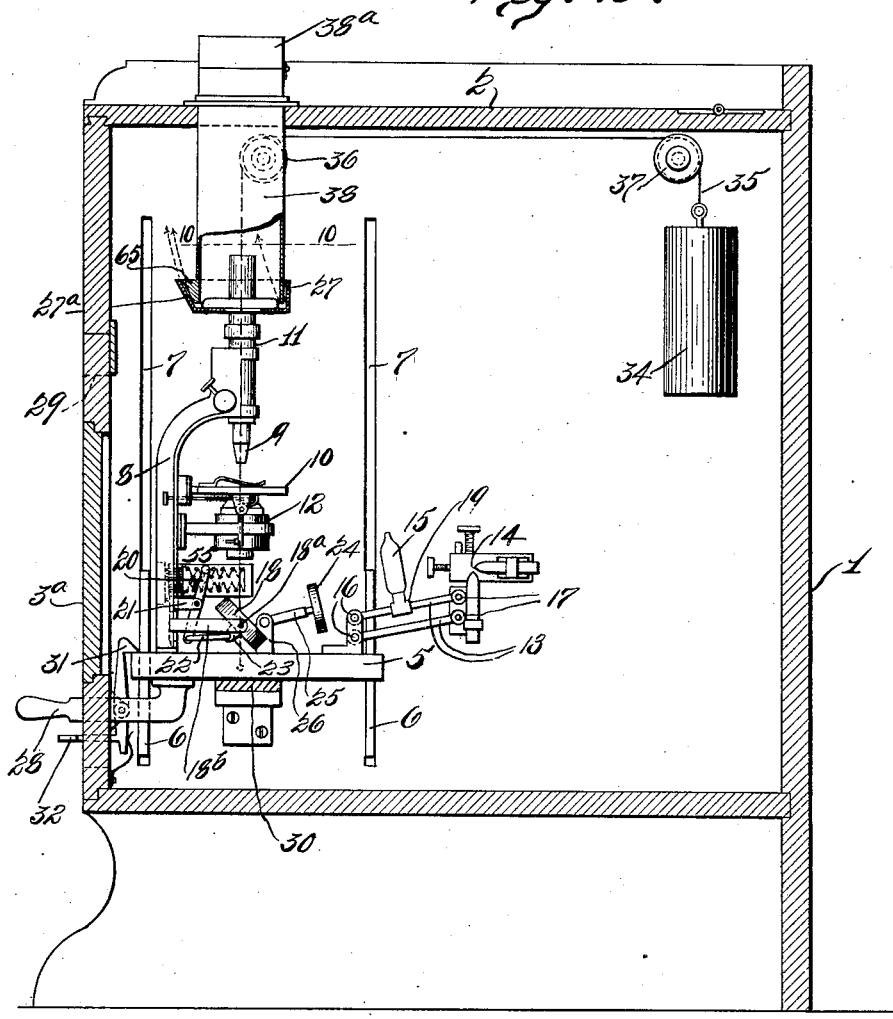
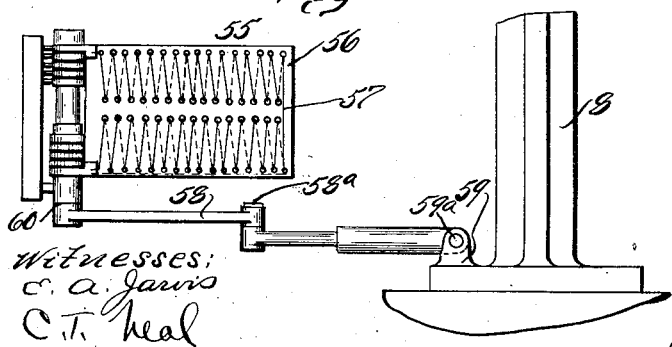
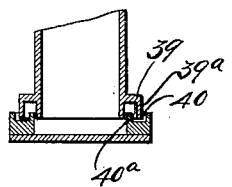

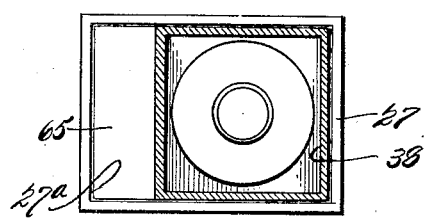
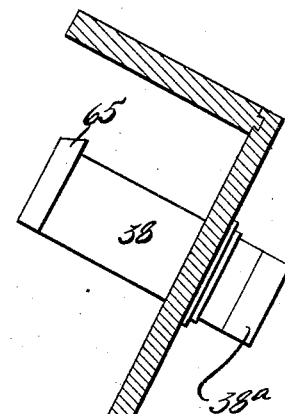
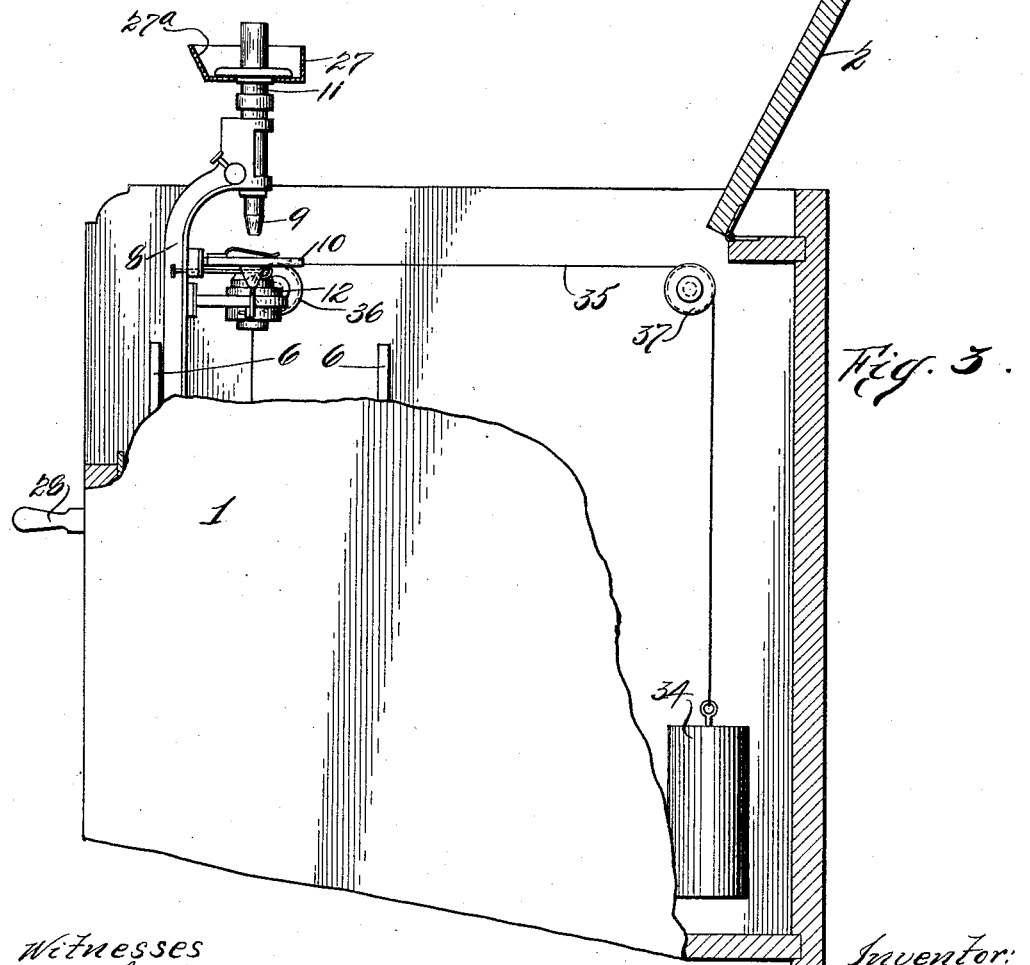

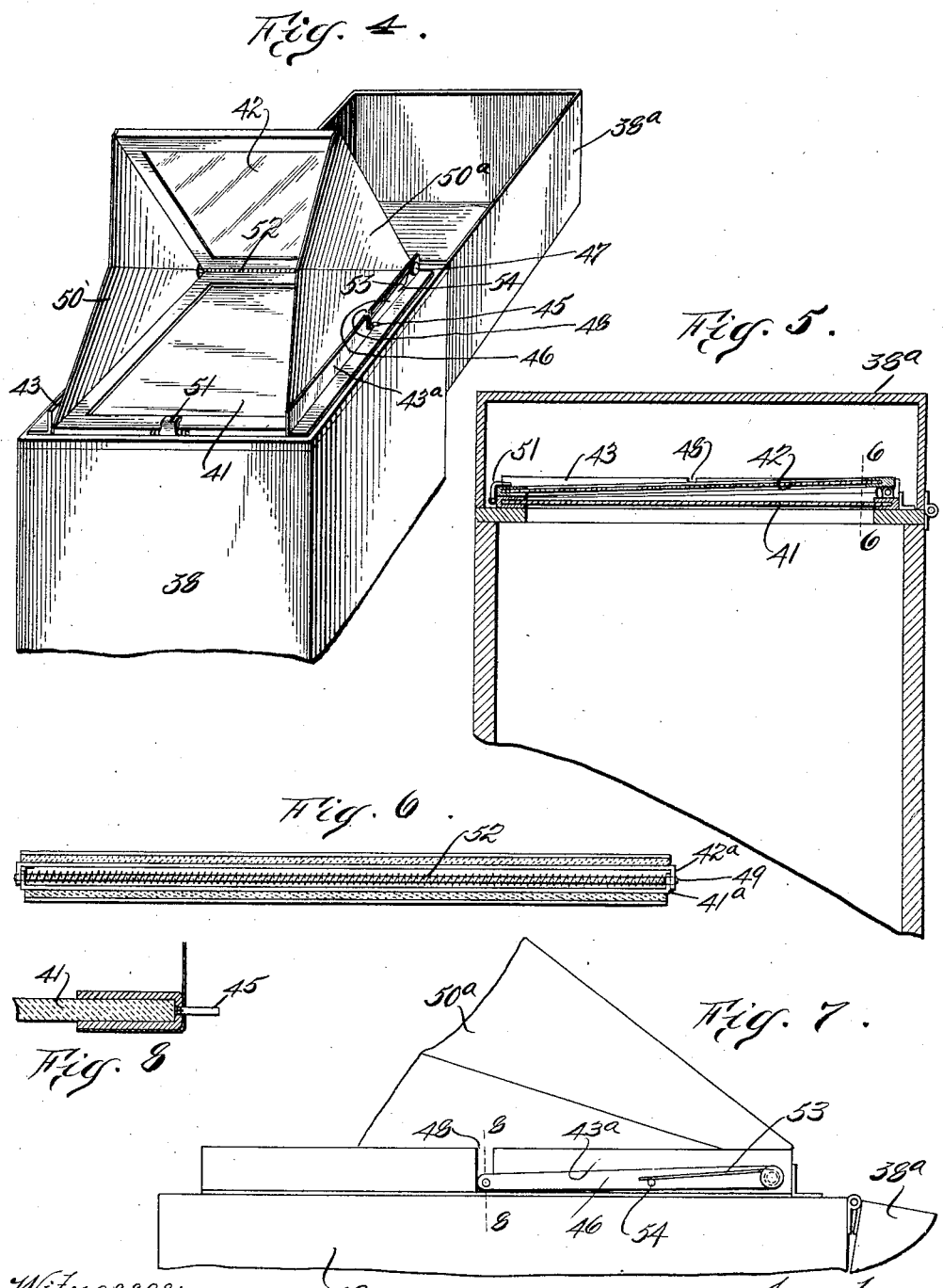

UNITED STATES PATENT OFFICE.

ROBERT L. WATKINS, OF NEW YORK, N. Y.

PHOTOMICROGRAPHIC AND PROJECTING APPARATUS.

1,049,182. Specification of Letters Patent. Patented Dec. 31, 1912.

Application filed December 23, 1910. Serial No. 598,974.

*To all whom it may concern:*

Be it known that I, ROBERT L. WATKINS, a citizen of the United States, residing at New York, borough of Manhattan, county and State of New York, have invented certain new and useful Improvements in Photomicrographic and Projecting Apparatus, of which the following is a specification.

The present invention relates to photomicrographic and projecting apparatus and the main object of the invention is to provide means for reflecting magnified images, and it is specially useful for physicians as in the examination of the blood.

One of the special objects of the invention is to provide means for reflecting a magnified image thrown from a microscope in such a way that the observer can view the reflection in the usual seated position so that the observer does not have to bend over as in customary microscope work.

A further special object of the invention is to prevent such jarring or vibration of the apparatus as will preclude a clear and complete reflection of the image.

A still further and special object of the invention is to mount the apparatus upon and in connection with a desk such as the usual typewriter desk, in which there is a movable top, and by which the entire working parts of the apparatus may be entirely inclosed.

Other objects of the invention are to render apparatus of the character described more efficient and reliable in use, as by providing special adjustments for the condensing lens and reflector used in projecting a beam of light through the microscope and into the camera.

It may be mentioned that another object of the invention is to provide an apparatus of the type mentioned which may be used in taking enlargements of microscopic objects which are in motion, in a moving picture machine, so that the movements of microscopic animal organisms may be viewed on a vastly magnified scale by large audiences.

These being among the objects of the present invention, the same consists of certain features of construction and combination of parts to be hereinafter described and then claimed with reference to the accompanying drawings showing a suitable form of the invention and in which—

Figure 1:
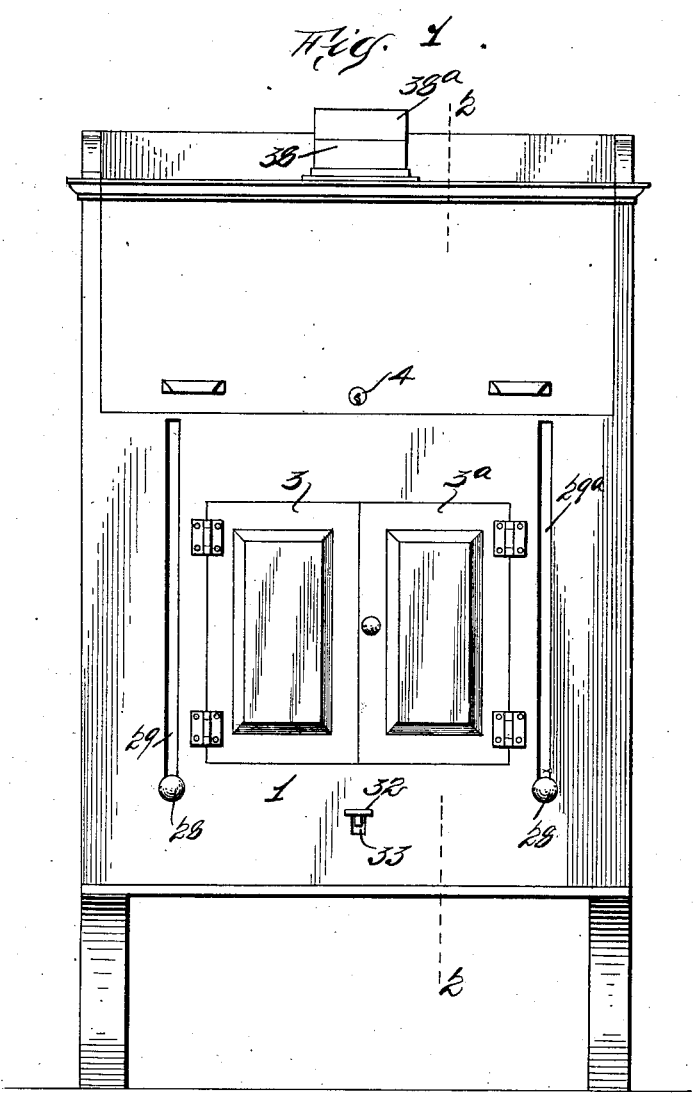
Figure 9:
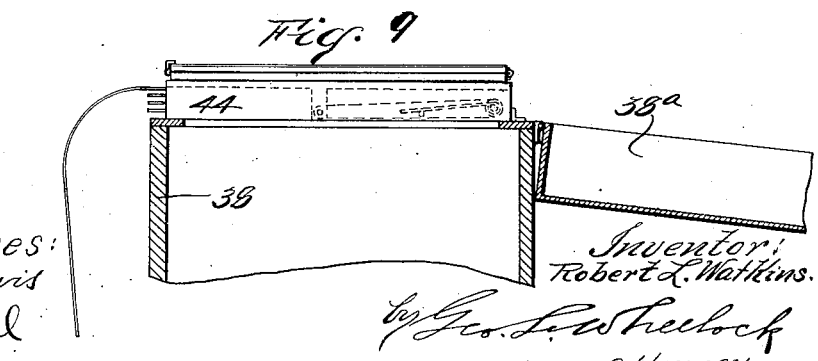

Figure 1 is a front elevation of my improved photomicrographic and projecting apparatus contained within an inclosure such as a desk; Fig. 2 is a vertical transverse section on the line 2—2 Fig. 1; Fig. 3 is a similar section of some of the same parts, in which the desk is shown as open; Fig. 4 is an enlarged perspective view of the preferred form of camera in which a screen and a reflecting mirror are shown with a view to permitting the mirror to reflect the enlarged image thrown upon the screen; in this view the parts are open; Fig. 5 is a vertical transverse section of the same parts shown in Fig. 4, in closed position; Fig. 6 is an enlarged transverse section on the lines 6—6 Fig. 5; Fig. 7 is a side elevation of the parts shown in Fig. 4, partly broken away; Fig. 8 is a detail transverse section on the line 8—8 Fig. 7; Fig. 9 is a sectional detail view showing how the camera is used with a film-pack; Fig. 10 is an enlarged detail section on the line 10—10 Fig. 2; Fig. 11 is a detail view showing how a rheostat may be mounted upon the apparatus, and Fig. 12 is a detail vertical sectional view of modified means for excluding extraneous light from the dark chamber of the camera box.

Referring more particularly to Figs. 1, 2 and 3, my improved photomicrographic and projecting apparatus is shown as capable of being inclosed in a desk or like inclosure. The desk may obviously be of any suitable construction adapted for the particular use to which it is to be put, and preferably comprises a desk body 1 and a hinged top 2. The body 1 is preferably provided with suitable doors such as 3—3$^a$ located at the front so that the user of the apparatus may have access thereto, while the lid or cover 2 may obviously be locked to the body as at 4 so as to preclude access to the apparatus by unauthorized persons. The doors 3—3$^a$ should also be preferably locked. When the apparatus is mounted on parts such as described, it is obviously practically stationary, but my invention comprises also portable apparatus, which one can carry about.

When the invention is in the form shown, the apparatus preferably comprises parts to be described: A movable support 5 is mounted in the desk body 1 upon runners 6 which are guided vertically in grooves 7 in the walls of the desk. Said support 5 carries the mechanism of the apparatus proper, with the exception of the camera box and concomitant parts to be hereafter described. Rising from the movable support 5 is a post 8, upon which is supported the microscope tube 11 which as well-known is provided at its upper end with an eyepiece not shown and with an objective 9. A suitable stage is preferably supported upon the post 8 so as to be adjustable to or from the microscope. As is well-known, this stage 10 is to receive a slide, not shown, containing the preparation or object to be viewed or photographed, and said stage as is well-known has a central opening, not shown, to permit light to pass up from below through the slide and into the microscope tube 11 which carries the objective 9. Located below the stage 10 is the well-known photographic shutter 12, which is not shown in detail as any suitable form of shutter may be employed. This shutter is used in taking pictures through the microscope tube 11, but in magnifying, the shutter is set to open position so as to admit a beam of light through its iris. Suitably mounted upon the movable support 5 as by means of a pair of rods 13 is an arc lamp 14 and an incandescent lamp 15. The said rods are preferably pivoted to a part of the movable support 5 at 16 and the arc lamp 14 is pivotally supported upon the said rods at 17. The pivoted support for the arc lamp 14 is obviously such that the lamp will be always supported in a vertical position, but may be adjusted higher or lower and nearer or farther away from the reflector 18. The incandescent lamp 15 may be used in some cases, to which end it has a swivel connection at 19 with one of said rods 13 so that it may be moved away from the beam of light cast by the arc lamp, when the latter is in use.

The reflecting mirror 18 referred to is located at the angle around which the beam of light cast by the lamp is bent. It is preferably mounted by means of side pivots 18$^a$ upon a bracket or brackets 18$^b$ projecting from the post 8. To preclude handling of the reflector 18 when in use, and to secure ready adjustment thereof for obvious reasons, a finger lever or adjusting member 20 is provided which is pivoted upon a bracket 21 on post 8, and which is connected by means of a link 22, with a lug 23 at one side of the frame of the reflector. A condenser 24 is preferably located between the lamp or lamps and the reflector 18, the same being mounted upon an arm 25 which is pivoted to a bracket 26 on the movable support 5. Said arm 25 preferably has friction engagement with the bracket 26 so that it may be held in the position to which the said condenser may be adjusted. A dished or flanged member 27 is preferably supported at the upper end of the microscope tube 11 for the purpose to hereafter appear.

From the above description it is obvious that the movable support 5 and the parts of the apparatus carried thereby are adapted to be raised or lowered, respectively, to attain more ready access to the apparatus by raising them into the position shown in Fig. 3, and to store the parts of the apparatus into the desk. Any suitable means may be used for raising or lowering the apparatus parts mentioned, but in the form of invention shown, these parts comprise handles 28 which extend from the movable support 5 through slots 29—29$^a$ in the front of the desk body 1, so that the ends of the handles may be grasped. The desk body 1 is preferably provided with an abutment or crossbar 30 upon which the movable support 5 is held by means of a spring actuated latch 31, which may be provided with a finger piece 32 which extends out of the body 1 through an opening 33 so that the latch may be released from the movable support by the hand of the operator. To assist in raising the apparatus parts mentioned and to hold the same in elevated position as shown in Fig. 3, the said parts are preferably counter-balanced as by weight 34 which is suspended from a cord or wire 35 which is trained over pulleys 36—37 that are mounted to turn on fixed journals at the upper part of the desk body just under the lid or cover 2, said cord or wire being connected with the movable support 5.

The lid or cover 2 of the desk supports the parts more clearly shown in Figs. 4 to 10 inclusive. These parts comprise a camera box 38 which forms a dark chamber and which hangs for its greater length below the lid or cover 2, a short length projecting above the cover. Said camera box 38 may be supported in vertical position upon the cover or lid 2 in any suitable manner, preferably to prevent its removal from the lid by an unauthorized person. The length of the depending portion of the camera box 38 is such that when the lid or cover 2 is closed as shown in Fig. 2, its lower end will so coöperate with the flanged member 27 carried by the microscope, as to preclude the entrance of light into the dark chamber of the box. Such means may be constructed as shown in Fig. 2 or as shown in the modified form Fig. 12, in both of which the meeting parts are constructed so as to overlap and form a joint to cut off side rays of light which might find access into the camera box 38. In Fig. 2 the lower end of the camera box fits on three sides with corresponding sides of the flanged member 27, while on the fourth side of the camera box there is an inclined block 65, the inclined surface of which fits practically in contact with a correspondingly inclined side portion 27$^a$ of the flange member 27. For obvious reasons the inclined meeting portions are located at that side of the camera box which is remote from the hinge of the cover or lid. These parts are also shown in Fig. 10. In Fig. 12, which is perhaps the most desirable form, the lower end of the camera box is shown as provided with a groove 39 at one side of which is a lip 39ª, while the flange member 27 carried by the microscope has a groove 40 to one side of which is a lip 40ª. It will be seen that when the lid of the desk is closed that the lips 39ª and 40ª will enter their corresponding grooves and shut out lateral rays of light.

A valuable feature of my invention resides in a mirror device located at the upper end of camera box 38, and which is for the purpose of preventing the user of the apparatus from seeing parts or reflections of parts of the apparatus and to permit the user to use the apparatus without having to bend over. With this in view, there is arranged in connection with the screen 41 a projecting mirror 42, which is so mounted that it may be moved at an angle of approximately 45° relatively to the screen. The camera box 38 is for this purpose provided at its upper end with side flanges 43, 43ª which extend from the front toward the back of the box and which constitute a plate-holder or means for receiving under the screen 41 a film-pack 44 as shown in Fig. 9. This portion of the apparatus is shown also in Figs. 4, to 8 inclusive. It is obvious that the film-pack may be used in the usual way for taking photographs, and further explanation in this connection is not necessary. The space between the flanges 43, 43ª is just wide enough to receive the screen 41 and the mirror 42. Screen 41 is provided intermediate of its ends with pivot pins 45 which turn in bearings in the outer ends of swinging arms 46 which are mounted on pivots 47 which are located at the rear ends of said flanges 43—43ª. In order to permit the movable and swiveled screen 41 to lie flat upon the upper end of the camera box 38 so as to cover that end of the dark chamber, said flanges are provided with vertical recesses 48 which receive the said pivots 45 and which permit the arms 46 to be swung upwardly with the screen 41; this for the purpose of permitting a plate holder or a film-pack 41 to be placed under the screen for taking photographs. When an image is projected upwardly on to the screen 41, the latter should be placed flat upon the end of the camera box. The mirror 42 is hinged at its rear edge to the rear edge of the screen 41, as by means of hinge ears 42ª on said mirror, hinge ears 41ª on said screen, and a pivot rod 49 which passes through said ears. Flexible or bellows-like side portions 50, 50ª which are of triangular shape connect the side edges of the mirror 42 with the side edges of the screen 41, and permit a movement of the mirror 42 through an angle of approximately 45° relatively to the screen 41. A suitable catch 51 engages the front edge of the mirror 42 and holds the same down upon the screen and the folded-in flexible sides 50, 50ª, when the mirror is out of use. When the catch 51 is released from the mirror, the same springs up to its angular position, under the actuation of a spring 52 coiled around the pivot rod 49. A spring 53 mounted on one of the studs 47, or there may be two such springs, bears upon a lug 54 on the swinging arm 46, with a view to pressing the screen 41 down upon the top of the camera box. It will be obvious that when the apparatus is in use and a magnified image projected upwardly on to the screen 41, said image will be reflected by the mirror 42 forwardly toward the user if the mirror be raised to its inclined position. The said screen and projecting mirror and coöperating parts are inclosed within the hinged cover 38ª of the camera box when the same is swung to closed position.

Another feature of my invention resides in the means for supporting the rheostat of the instrument. This improvement is specially desirable in connection with portable apparatus and is clearly shown in Fig. 11. Said rheostat 55 may be of any suitable construction but preferably consists of mica sheets 56 through openings of which a high resistance wire 57 is threaded. The wire connections for the apparatus are not shown as these will be obvious to those skilled in the electric art. To support the said rheostat 55, a toggle jointed bracket arm 58 is pivoted to a lug 59 on the movable support 5 of the apparatus, its outer end supporting a pivot post 50 upon which the said rheostat is pivoted. The pivot 60 for the rheostat and the pivot 58ª of the folding bracket arm 58 are preferably arranged vertically while the pivot 59ª which supports the bracket arm is preferably arranged horizontally so that the parts supported by the lug 59 may be folded up into small space.

The operation and use of the apparatus described will be apparent to those skilled in the art; and obviously parts may be omitted from the apparatus, parts added and parts modified without changing the spirit and scope of the invention.

What I claim as new is:

1. In a photomicrographic and projecting apparatus, the combination of a magnifying instrument, a camera box or dark chamber operatively connected with and in line with it, and a movable mirror arranged in connection with said box and suitably mounted to be positioned at an angle relative to a horizontal plane.

2. In a photomicrographic and projecting apparatus, the combination of a magnifying instrument, a camera box or dark chamber operatively connected with and in line with it, and a movable mirror arranged in connection with said box and suitably mounted to be positioned at an angle relative to a horizontal plane, said camera box having a screen and said mirror being located over said screen.

3. In a photomicrographic and projecting apparatus, the combination of a magnifying instrument, a camera box or dark chamber operatively connected with and in line with it, said camera box having a screen, a mirror movably mounted over said screen, and means for positioning said mirror at an angle relative to said screen.

4. A photomicrographic and projecting apparatus comprising, in combination, a screen, a mirror movable above said screen at an angle relatively thereto, and a magnifying instrument located directly in line with said screen so as to project the magnified image directly onto said screen.

5. In combination, an objective screen for receiving an image and a mirror adjustable relatively to said screen at an angle, and a magnifying instrument located directly in line with said screen so as to project a magnified image directly onto said screen.

6. In combination, an objective screen, a pivoted mirror above said screen, and a magnifying instrument located directly in line with said screen so as to project a magnified image directly onto said screen.

7. In combination, an objective screen, a mirror mounted so as to be moved at an angle to said screen to reflect the image on said screen, and a magnifying instrument located directly in line with said screen so as to project a magnified image directly onto said screen.

8. In combination, an objective screen and a mirror mounted so as to be moved at an angle to said screen to reflect the image on said screen, and flexible sides connecting the two said parts, the space inclosed by said parts being wholly open in front.

9. In combination, an objective screen and a mirror mounted so as to be moved at an angle to said screen to reflect the image on said screen, and means acting on said mirror for positively moving it to reflecting position.

10. In combination, an objective screen and a mirror mounted so as to be moved at an angle to said screen to reflect the image from said screen, means for holding the mirror closed, and means for automatically raising the mirror to reflecting position when released.

11. In combination, a camera box, a screen and a mirror, said screen and mirror being movably supported by said box, and a magnifying instrument located directly in line with said screen so as to project a magnified image directly onto said screen.

12. In a photomicrographic and projecting apparatus, the combination of a magnifying instrument, a camera box provided with a screen, said instrument pointing through said box, and means for excluding light from between the magnifying instrument and the walls of said box.

13. In a photomicrographic and projecting apparatus, the combination of a magnifying instrument, means for supporting it, a screen on to which said instrument directly projects an image, said screen being movable relatively to said instrument, and means for precluding the transmission of vibration from said supporting means to said screen or vice versa.

14. In combination, a desk-like supporting base, a magnifying instrument supported thereby, a movable lid for said desk, and a screen carried by said lid and on to which an image may be projected by said magnifying instrument.

15. In combination, a desk-like supporting base, a magnifying instrument supported thereby, a movable lid for said desk and a screen carried by said lid and on to which an image may be projected by said magnifying instrument, and a movable mirror carried by said lid above said screen.

16. In a photomicrographic and projecting apparatus, the combination with a lamp, a reflector and a magnifying instrument, a condenser, and a pivoted arm on which the condenser is mounted.

17. In a photomicrographic apparatus, the combination of a pivoted reflector for projecting a beam of light, and means operatively connected with said reflector for adjusting it, said means being supported from the reflector itself.

ROBERT L. WATKINS.

Witnesses:
GEO. L. WHEELOCK,
L. A. WATSON.